United States Patent [19]
Smith

[11] Patent Number: 5,161,876
[45] Date of Patent: Nov. 10, 1992

[54] LAMP ASSEMBLY

[75] Inventor: Alan K. Smith, Cannock, England

[73] Assignee: Carello Lighting public limited company, England

[21] Appl. No.: 651,135

[22] Filed: Feb. 6, 1991

[30] Foreign Application Priority Data

Mar. 6, 1990 [GB] United Kingdom ............. 9005044.4

[51] Int. Cl.⁵ ............................................. B60Q 1/03
[52] U.S. Cl. ..................... 362/66; 362/269; 362/285; 362/421; 362/427
[58] Field of Search ..................... 362/61, 66, 80, 269, 362/273, 285, 289, 418, 419, 420, 421, 422, 427, 428

[56] References Cited

U.S. PATENT DOCUMENTS

| | | | |
|---|---|---|---|
| 4,356,539 | 10/1982 | Shanks | 362/273 |
| 4,621,307 | 1/1986 | Weber | 362/66 |
| 4,689,725 | 8/1987 | Saijo et al. | 362/66 |
| 4,722,029 | 1/1988 | Ahle et al. | 362/66 |
| 4,849,860 | 7/1989 | Schauwecher | 362/421 |
| 4,967,318 | 10/1990 | Evert et al. | 362/61 |

FOREIGN PATENT DOCUMENTS

| | | |
|---|---|---|
| 0225480 | 8/1986 | European Pat. Off. . |
| 0330885 | 10/1989 | European Pat. Off. . |
| 3509831 | 12/1985 | Fed. Rep. of Germany . |
| 2639588 | 6/1988 | France . |

Primary Examiner—Ira S. Lazarus
Assistant Examiner—Sue Hagarman
Attorney, Agent, or Firm—Leydig, Voit & Mayer

[57] ABSTRACT

A lamp assembly has a first, second and third connections which mount a reflector body on a fixed support to enable independent adjustment of the reflector body relative to the support. Each of the first and second connections includes a screw threaded rod engaged with a boss carried by the support. A ball on the rod engages in a socket. The socket is provided in a separate member having a pair oppositely directed elliptical springs through which the socket is mounted on a respective boss integral with the body. The springs permit a degree of elastic deformation in a direction which is radial with respect to the axis about which the reflector body can be tilted by rotation of the associated rod.

15 Claims, 2 Drawing Sheets

LAMP ASSEMBLY

TECHNICAL FIELD

This invention relates to a lamp assembly and is particularly, but not exclusively, concerned with a vehicle headlight assembly.

BACKGROUND OF THE INVENTION

In vehicle headlight assemblies, it is necessary to ensure that the lamp is correctly aimed so that it provides adequate illumination of the road without dazzling drivers of oncoming vehicles. For this purpose, it is necessary to mount the reflector body of the headlight assembly relative to a support in such a way that it can be adjusted by independent tilting movement about horizontal and vertical axes. It is common practice to mount the reflector body on the support through three pivotal connections each having a limited amount of universal pivotal movement. An adjusting screw is connected with each of two of the three pivotal connections so that each screw can be moved independently. The pivotal connections and adjusting screws are so arranged that rotation of one of the screws causes the headlamp to be tilted about a horizontal axis whilst rotation of the other screw causes tilting movement of the headlamp about a vertical axis. However, each adjusting screw moves linearly whilst the lamp body tilts about the respective pivot axis. The result of this is that a strain is applied which may be sufficiently severe to distort the reflector body sufficiently to affect the light beam performance.

SUMMARY OF THE INVENTION

It is an object of the present invention to provide a lamp assembly in which the above disadvantage can be obviated or mitigated.

According to the present invention, there is provided a lamp assembly comprising a reflector body, a support, and first, second and third connections between the reflector body and the support serving to mount the reflector body on the support, each of said connections including a respective universal joint, the connections being spaced apart and so mutually disposed that a first axis which passes through the centres of the universal joints of the first and third connections lies substantially perpendicular to a second axis which passes through the centres of the universal joints of the second and third connections, and the first and second connections including respective first and second adjusting screws, whereby rotation of the first and second adjusting screws causes the reflector body to be tilted respectively about the second and first axes; wherein at least one (and preferably both) of the first and second pivotal connections is provided with a flexible member which is capable of deforming elastically in a direction which is radial with respect to the axis about which the reflector body can be tilted by the associated adjusting screw.

Most preferably, each flexible member comprises a pair of opposed curved leaf springs. Such curved leaf springs permit a limited degree of linear resilience as well as radial resilience. Preferably, the leaf springs are elliptical leaf springs.

The invention is particularly applicable to lamp assemblies wherein the universal joints associated with the first and second connections are each provided by a socket fixed relative to the reflector body and a spherical end on a screw-threaded rod forming the adjusting screw, said screw-threaded rod being engaged in an internally screw-threaded member which is fixed relative to the support. In such a construction, it is particularly convenient for flexible member to be disposed between the socket of the associated connection and the reflector body.

Most conveniently, each socket and the respective flexible member are provided on a separate part which is adapted to be fixedly engaged with a respective formation on the reflector body.

Preferably, said formation comprises a boss having a bore into which a shaft on said separate part is received.

The shaft preferably has one or more barbs thereon which are shaped to permit the shaft to be inserted into the bore but to oppose withdrawal of the former from the latter. Preferably also, means are provided for preventing the separate part from being engaged with the respective formation except when the separate part and the formation are in a predetermined mutual orientation. Such means may take the form of a peg provided on an arm on the separate part and engageable in a locating hole in the formation on the reflector body.

BRIEF DESCRIPTION OF THE DRAWINGS

An embodiment of the present invention will now be described, by way of example, with reference to the accompanying drawings, in which.

DETAILED DESCRIPTION OF THE DRAWINGS

Figure 1:
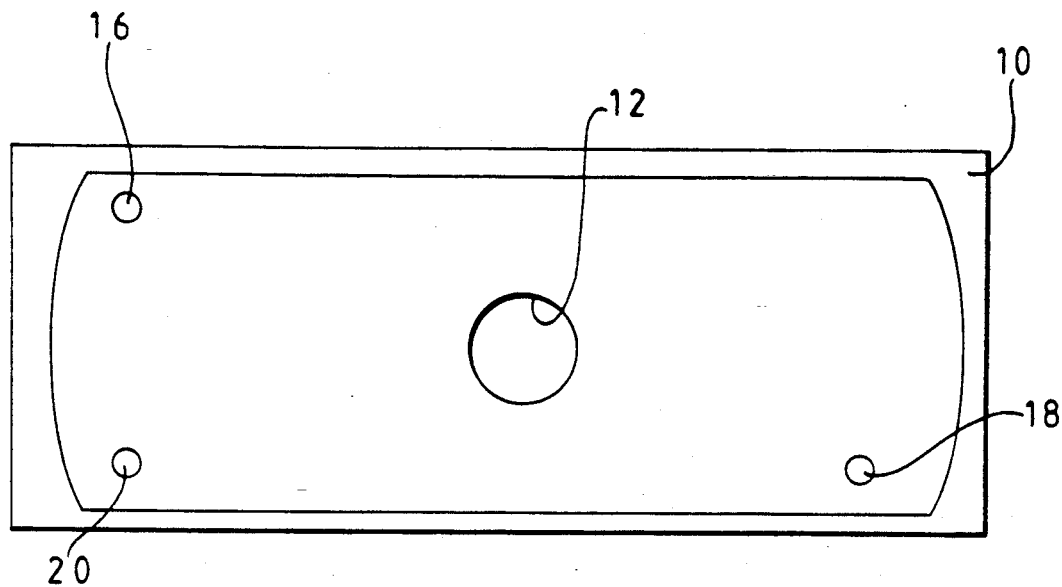
FIG. 1 is a schematic rear view of a lamp reflector body forming part of the lamp assembly according to the present invention.

Referring now to the drawings, the lamp assembly is a vehicle headlight assembly and comprises a dished reflector body 10 (FIG. 1) having an internal reflective surface (not shown) and a bulb-receiving aperture 12. The reflector body 10 is mounted on a support (which is only partly shown at 14 in FIG. 2) through a 3-point mounting arrangement. Such arrangement includes first, second and third pivotal connections 16, 18 and 20 respectively, whose locations relative to the reflector body 10 are illustrated diagrammatically in FIG. 1. Each of the pivotal connections 16, 18 and 20 includes a universal pivot constituted by a ball-and-socket joint. Each of the first and second pivotal connections 16 and 18 includes a screw-threaded rod.

Figure 2:
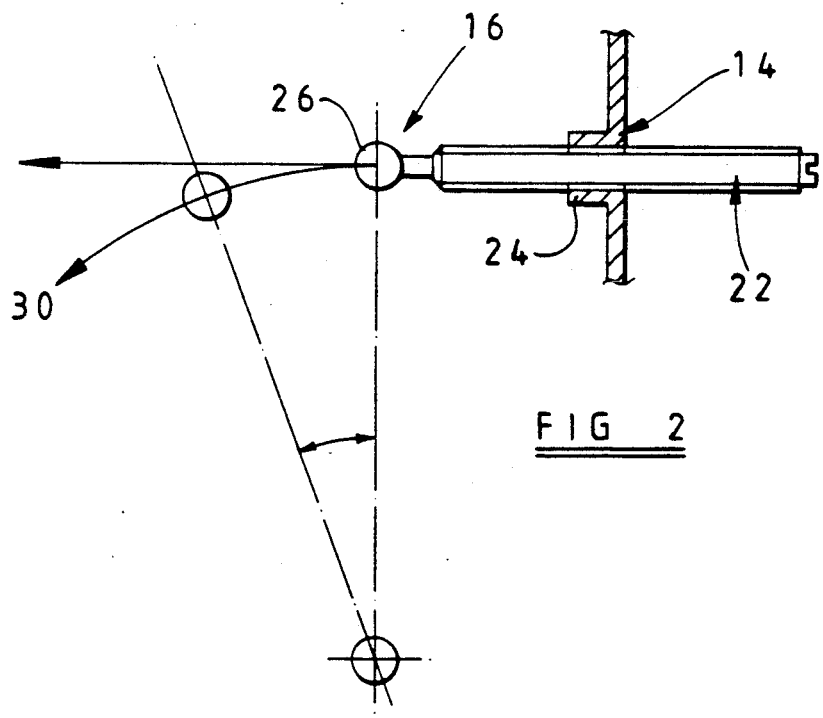
FIG. 2 is a sectional side elevation showing part of the lamp assembly according to the present invention.
Figure 3:
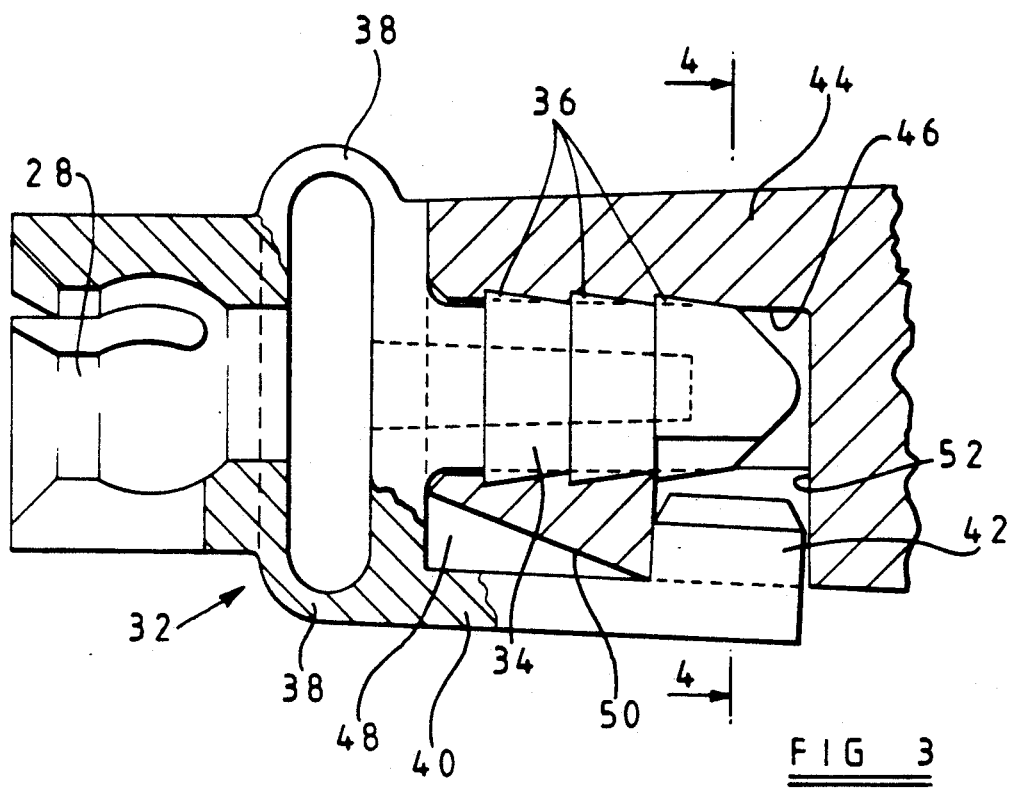
FIG. 3 is an axial section through a portion of a pivotal connection forming part of the lamp assembly according to the present invention.
Figure 4:
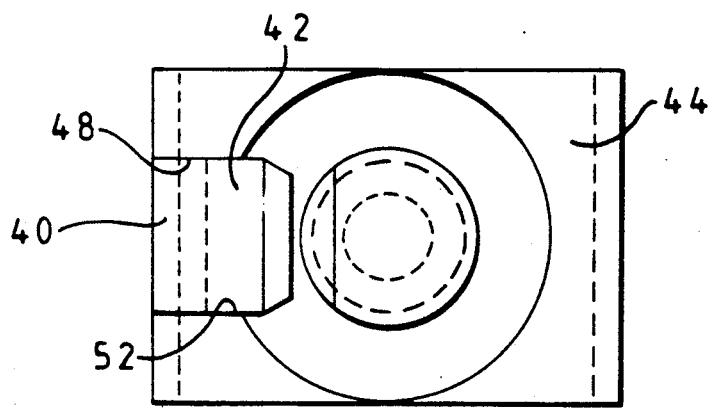
FIG. 4 is a cross-sectional view on the line 4—4 of FIG. 3.

In the drawings, only screw-threaded rod 22 associated with the first pivotal connection 16 is illustrated (see FIG. 2). The screw-threaded rod 22 is mounted for axial movement in an internally screw-threaded bush 24 which is fixed relative to the support 14. The screw-threaded rod 22 is horizontally disposed and carries a ball 26 which is a snap-fit in corresponding socket 28 (see FIG. 3). The second pivotal connection 18 is likewise constructed. In contrast, the third pivotal connection 20 has its ball mounted on a plain rod which is fixedly secured to the support 14. All three ball-and-socket joints associated with the first, second and third pivotal connections 16, 18 and 20 are mounted in the same vertical plane. Within this vertical plane, the first pivotal connection 16 is vertically spaced above the third pivotal connection 20, whilst the second pivotal connection is horizontally spaced from the second pivotal connection 18. Thus, it will be appreciated that rotation of the screw-threaded rod 22 associated with the first pivotal connection 16 will cause the reflector body 10 to tilt about a horizontal axis passing through the centres of the ball-and-socket joints associated with the second and third pivotal connections 18 and 20. Likewise, rotation of the screw-threaded rod associated with the second pivotal connection 18 will cause the reflector body 10 to be pivoted about a vertical axis passing through the centres of the ball-and-socket joints associated with the first and third pivotal connections 16 and 20. In this way, selective adjustment of the vertical and horizontal angles of tilt of the reflector body 10 relative to the support 14 is permitted for headlight aiming purposes. Thus far, the lamp construction is of a per se known type.

However, with the above type of arrangement, it will be appreciated that rotation of the screw-threaded rod 22 results in linear movement of the ball 26. Since such movement is accompanied by tilting movement of the reflector body 10, a strain in the system results because the ball 26 cannot adopt an arcuate direction of travel which is that dictated by the socket 28. The required arcuate direction of travel of the socket 28 is illustrated in FIG. 2 by arrow 30. It will be appreciated that the socket 28 with which the ball 26 is engaged is, in conventional constructions, rigidly fixed to the reflection body 10. However, in accordance with the present invention, the socket 28 in the lamp assembly of the present invention is not rigidly secured to the reflector body 10 but is connected in a manner which permits some compliance so as to avoid stressing the parts and thereby avoid possible distortion of the reflector body 10. In this embodiment, socket 28 is formed in a separate member 32. Such member 32 includes a shaft 34 having a series of frusto-conical barbs 36 thereon. The shaft 34 is hollow so as to allow a limited degree of inward resilience. The socket 28 is connected with the shaft 34 through a pair of oppositely directed elliptical springs 38 which are integrally formed with the socket 28 and the shaft 34. Also integrally formed as part of the member 32 is an arm 40 which extends substantially parallel to the axis of shaft 34 from a location adjacent one of the springs 38 towards the free end of the shaft 34. The free end of the arm 40 has an inwardly directed peg 42. At the locations of each of the first and second pivotal connections 16 and 18 illustrated in FIG. 1, the reflector body 10 has a respective boss 44 integrally moulded therewith. In this embodiment, it is to be appreciated that the reflector body 10 and the bosses 44 are formed out of a relatively rigid and temperature resistant synthetic resin. The boss 44 (see FIG. 3) is moulded with a circular bore 46 therein which is of a size such that the frusto-conical barbs 36 on the shaft 34 are a tight fit therein. On one side thereof, the boss 44 has a locating groove 48 in which the arm 40 of the member 32 is a sliding fit. The groove 48 has a base in the form of a ramp surface 50 which is inclined outwardly of the boss 44 when going from the free end thereof to that end which is integrally secured to the lamp body 10. The groove 48 leads to a locating hole 52 formed in one side of the boss 44. It will be appreciated from the above that the shaft 34 is a tight push-fit within the bore 46 of the boss 44 and that the barbs 36 are tightly engaged in the bore 46 so as to provide a firm and tilt-free engagement of the member 32 with the boss 44. However, engagement of the member 32 with the boss 44 is only permitted in one position of angular orientation of the member 32 relative to the boss 44. This is because of the provision of the arm 40 with peg 42 which has to be aligned with the groove 48. Once this has been achieved, the peg 42 rides along the ramp surface 50 during engagement of the shaft 34 in the bore 46 until the peg 42 snaps into the locating hole 52. Once this has taken place, the member 32 is securely fixed relative to the boss 44 and therefore securely fixed to the reflector body 10. Each boss 44 has its locating hole 52 so angularly positioned that the springs 38 are inevitably orientated in a manner which permits the required resilient compliance permitting flexure of the socket 28 relative to the respective boss 44 in the required radial direction relative to the appropriate pivot axis of the reflector body 10. The arrangement of elliptical springs 38 also permits a small degree of linear as well as radial flexure so that the ball 26, even though it is engaged with the socket 28, can adopt a true linear motion without undue strain being placed upon the reflector body 10.

It will be appreciated from the above that the bosses 44 associated with the first and second pivotal connections 16 and 18 will be mutually disposed with the axes of their locating holes 52 respectively vertically and horizontally disposed.

I claim:

1. A lamp assembly comprising
   a reflector body;
   a support; and
   first, second and third connections, two of which are pivotal, disposed between said reflector body and said support serving to mount said reflector body on said support, each of said connections including a respective universal joint, said connections being spaced apart and so mutually disposed that a first axis which passes through the centers of said universal joints of said first and third connections lies substantially perpendicular to a second axis which passes through the centers of said universal joints of said second and third connections, and said first and second connections including respective first and second adjusting screws, whereby rotation of the first and second adjusting screws causes said reflector body to be tilted respectively about the second and first axes;
   wherein at least one of said first and second pivotal connections includes a socket into which a ball on the respective adjusting screw engages and a flexible member provided between the socket and said reflector body which is capable of deforming elastically in a direction which is radial with respect to the axis about which said reflector body can be tilted by the associated adjusting screw.

2. The lamp assembly according to claim 1, wherein each of said first and second pivotal connections is provided with a respective one of said flexible members.

3. The lamp assembly according to claim 2, wherein said flexible member comprises a pair of opposed curved leaf springs.

4. The lamp assembly according to claim 3, wherein said leaf springs are elliptical leaf springs.

5. The lamp assembly according to claim 1, wherein said socket is mounted on said reflector body and the ball is provided on a screw-threaded rod forming said adjusting screw, said screw-threaded rod being engaged in an internally screw-threaded member which is fixed relative to said support.

6. The lamp assembly according to claim 5, wherein each said socket and the respective flexible member are provided on a separate part which is adapted to be fixedly engaged with a respective formation on said reflector body.

7. The lamp assembly according to claim 6, wherein said formation comprises a boss having a bore into which a shaft on said separate part is received.

8. The lamp assembly according to claim 7, wherein said shaft has one or more barbs thereon which are shaped to permit said shaft to be inserted into the bore but to oppose withdrawal of said shaft from said bore.

9. The lamp assembly according to claim 6, wherein means are provided for preventing said separate part from being engaged with the respective formation except when said separate part and said formation are in a predetermined mutual orientation.

10. The lamp assembly according to claim 9, wherein said means takes the form of a peg provided on an arm on said separate part and engageable in a locating hole in said formation on said reflector body.

11. A connection member for use in a lamp assembly to connect an adjustment rod with a reflector body, comprising:
- a shaft having a series of frusto-conical barbs on an outer surface for engaging said shaft with a reflector body;
- a socket for securing a ball of an adjustment rod;
- a resilient member disposed between and interconnecting said socket and said shaft so that when said shaft is engaged with a reflector body and a force is exerted on said socket, said socket pivots relative to said shaft.

12. A connection member according to claim 11 further comprising a locking arm extending parallel to an axis of said shaft having a peg on one end directed toward said shaft.

13. A connection member according to claim 11 wherein said resilient member comprises a pair of opposed curved leaf springs.

14. A connection member according to claim 13 wherein said leaf springs are elliptical.

15. A lamp assembly comprising:
- a reflector body having a number of connection points disposed on a surface;
- a support spaced from said reflector body;
- a number of adjustment rods interconnecting said reflector body and said support, each rod including a ball at one end;
- a connection member associated with each connection point, said connection members engaging the balls of said adjustment rods and the connection points of said reflector body, at least two of said connection members having a barbed conical shaft, a socket for engaging the ball of said adjustment rod and a resilient member interconnecting the socket and the barbed conical shaft;
- whereby rotation of the adjustment rods causes said reflector body to be tilted and the resilient member permits the sockets to flex in a direction which is radial with respect to an axis about which said reflector said reflector body is tilted.

* * * * *